(12) United States Patent
Burka et al.

(10) Patent No.: US 8,447,793 B2
(45) Date of Patent: May 21, 2013

(54) EFFICIENT REMEMBERED SET FOR REGION-BASED GARBAGE COLLECTORS

(75) Inventors: Peter Wiebe Burka, Ottawa (CA); Jeffrey Michael Disher, Ottawa (CA); Daryl James Maier, Unionville (CA); Aleksandar Micic, Ottawa (CA); Ryan Andrew Sciampacone, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 13/153,402

(22) Filed: Jun. 4, 2011

(65) Prior Publication Data

US 2012/0310998 A1 Dec. 6, 2012

(51) Int. Cl.
*G06F 12/00* (2006.01)
*G06F 17/30* (2006.01)

(52) U.S. Cl.
USPC .......................................... 707/813; 711/159

(58) Field of Classification Search
None
See application file for complete search history.

(56) References Cited

U.S. PATENT DOCUMENTS

| | | | | |
|---|---|---|---|---|
| 5,845,298 | A * | 12/1998 | O'Connor et al. ................. | 1/1 |
| 5,930,807 | A * | 7/1999 | Ebrahim et al. .................... | 1/1 |
| 7,174,354 | B2 * | 2/2007 | Andreasson ....................... | 1/1 |
| 7,340,494 | B1 * | 3/2008 | Detlefs et al. ..................... | 1/1 |
| 7,412,580 | B1 | 8/2008 | Garthwaite | |
| 7,539,837 | B1 | 5/2009 | Flood et al. | |
| 7,617,264 | B1 | 11/2009 | Garthwaite | |
| 7,650,350 | B1 | 1/2010 | Garthwaite | |
| 2004/0168030 | A1 * | 8/2004 | Traversat et al. ............. | 711/133 |
| 2008/0120624 | A1 * | 5/2008 | Borman et al. ................ | 719/316 |
| 2010/0185703 | A1 | 7/2010 | Ylonen | |

OTHER PUBLICATIONS

Sonntag, Patrick, "State of the Art Garbage Collection," Stuttgart, available at http://files.sonntaghome.net/State%20of%20the%20Art%20-%20Garbage%20Collection.pdf, Apr. 29, 2009.

Detlefs, David, et al., "Concurrent Remembered Set Refinement in Generational Garbage Collection," Proceedings of the USENIX Java VM '02 Conference, Aug. 1-2, 2002, San Francisco, CA.

Hosking, Anthony, et al., "Remembered Sets Can Also Play Cards," In OOPSLA'93 Workshop on Garbage Collection and Memory Management, 1993.

(Continued)

*Primary Examiner* — Usmaan Saeed
*Assistant Examiner* — Azam Cheema
(74) *Attorney, Agent, or Firm* — Nelson and Nelson; Daniel P. Nelson; Alexis V. Nelson

(57) ABSTRACT

A method for efficiently implementing a remembered set for a region-based garbage collector includes maintaining, for each region in an object heap, a remembered set card list (RSCL). Each card in the RSCL identifies an area in the object heap that includes at least one object that references an object in the region associated with the RSCL. The method further establishes a collection set identifying a subset of regions in the object heap on which to perform partial garbage collection. Prior to performing the partial garbage collection, the method flushes cards from RSCLs associated with the collection set to the card table, globally discards cards that are about to be rebuilt from all RSCLs, and globally cleans the card table. The method then adds cards to the RSCLs for inter-region references discovered while traversing live objects in the collection set. A corresponding computer program product and apparatus are also disclosed.

20 Claims, 8 Drawing Sheets

OTHER PUBLICATIONS

Azagury, Alain, et al., "Combining Card Marking with Remembered Sets: How to Save Scanning Time," ISMM '98 Proceedings of the 1st International Symposium on Memory Management, 1998.

Detlefs, Davie, et al., "Garbage-First Garbage Collection," ISMM '04 Proceedings of the 4th International Symposium on Memory Management, 2004.

Ungar, David, "Generation Scavenging: A Non-Disruptive High Performance Storage Reclamation Algorithm," Proceedings of the First ACM SIGSOFT/SIGPLAN Software Engineering Symposium on Practical Software Development Environments, 1984.

* cited by examiner

US 8,447,793 B2

EFFICIENT REMEMBERED SET FOR REGION-BASED GARBAGE COLLECTORS

BACKGROUND

1. Field of the Invention

This invention relates to memory management, and more specifically to apparatus and methods for efficiently implementing remembered sets in region-based garbage collectors.

2. Background of the Invention

In an object-oriented managed runtime, such as the Java Virtual Machine (JVM), Microsoft Common Language Runtime (CLR), or Smalltalk runtime, the primary memory resource is a garbage-collected object heap. The object heap provides memory for objects, each of which is an instance of a class. All managed runtimes support object garbage collection. Garbage collection attempts to reclaim memory occupied by garbage, which may include objects, data, or other areas in memory that are no longer in use by programs.

Various different approaches exist for collecting garbage on the object heap. One approach is to divide the object into a number of equally-sized regions. One example of a collector that uses such an approach is Sun's Garbage-First collector. In order to reduce pause times, a region-based collector may perform garbage collection on a subset of the total number of regions in the object heap. This subset may be referred to as a "collection set." To properly perform garbage collection on a collection set, the collector needs to discover references from objects outside of the collection set to objects inside of the collection set. These references are remembered in what is known as a "remembered set."

Various different approaches have been utilised or proposed for implementing a remembered set. Some of these approaches, however, are not applicable to general region-based garbage collectors, because they make assumptions about regions in the collection set. For example, one prior art approach only remembers references from "older" generations to "younger" generations. Such assumptions may not be applicable to generalized region-based garbage collectors, which may operate on arbitrary sets of regions in the collection set.

Other approaches have high space overhead, meaning that they consume a large amount of memory as a percentage of the object heap. For example, using the popular SPECjbb® benchmark, one test showed that the Garbage-First collector's remembered set consumed space equivalent to thirty percent of the object heap. Even after applying various optimizations to the Garbage-First remembered set, the remembered set still consumed as much as twenty percent of the object heap.

In view of the foregoing, what is needed is a more efficient approach for implementing a remembered set for region-based garbage collectors. Ideally, such an approach will work for any arbitrary set of regions in the collection set. Such an approach will also ideally minimize the amount of memory used as a percentage of the object heap.

SUMMARY

The invention has been developed in response to the present state of the art and, in particular, in response to the problems and needs in the art that have not yet been fully solved by currently available apparatus and methods. Accordingly, the invention has been developed to provide apparatus and methods to more efficiently implement a remembered set in region-based garbage collectors. The features and advantages of the invention will become more fully apparent from the following description and appended claims, or may be learned by practice of the invention as set forth hereinafter.

Consistent with the foregoing, a method for efficiently implementing a remembered set for a region-based garbage collector is disclosed herein. In one embodiment, such a method includes maintaining, for each region in an object heap, a remembered set card list (RSCL). Each RSCL contains a list of cards from a card table. Each card in the RSCL identifies an area in the object heap that includes at least one object that references an object in the region associated with the RSCL. The method further establishes a collection set. The collection set identifies a subset of regions in the object heap on which to perform partial garbage collection. Prior to performing the partial garbage collection, the method flushes cards from RSCLs associated with the collection set to the card table and globally discards cards that are about to be rebuilt from all RSCLs. The method then rebuilds the cards in the RSCLs during card cleaning and while traversing live objects in the collection set.

A corresponding computer program product and apparatus are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
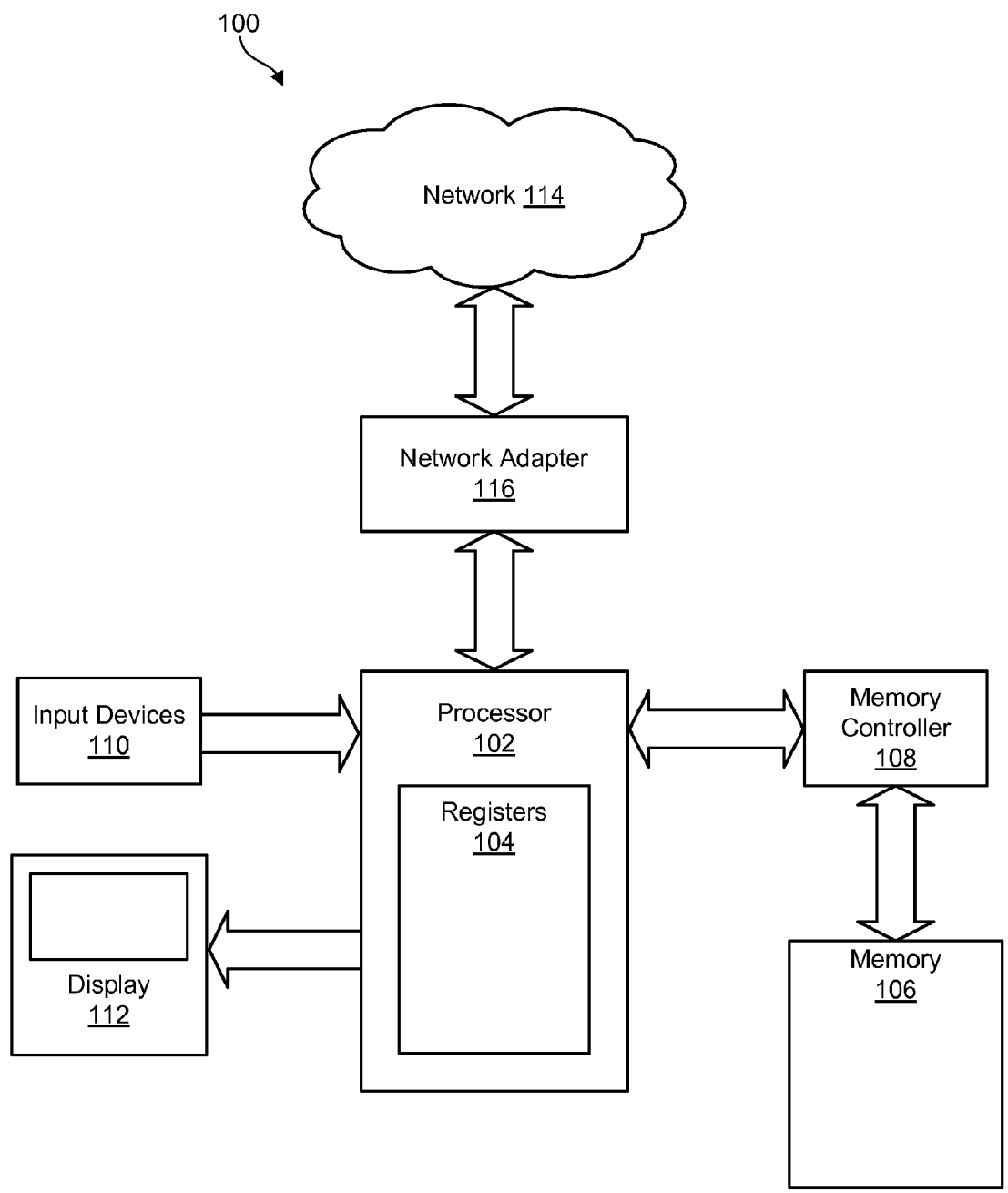
FIG. 1 is a high-level block diagram showing one example of a computer system suitable for use with various embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example, an electronic, magnetic, optical, electromagnetic, infrared, or semiconductor system, apparatus, or device. More specific examples (a non-exhaustive list) of the computer-readable storage medium may include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain or store the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computer system 100 is illustrated. The computer system 100 is presented to show one example of an environment where an apparatus and method in accordance with the invention may be implemented. The computer system 100 is presented only by way of example and is not intended to be limiting. Indeed, the apparatus and methods disclosed herein may be applicable to a wide variety of different computer systems in addition to the computer system 100 shown. The apparatus and methods disclosed herein may also potentially be distributed across multiple computer systems 100.

The computer system 100 includes at least one processor 102 and may include more than one processor. The processor 102 includes one or more registers 104 storing data describing the state of the processor 102 and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2:
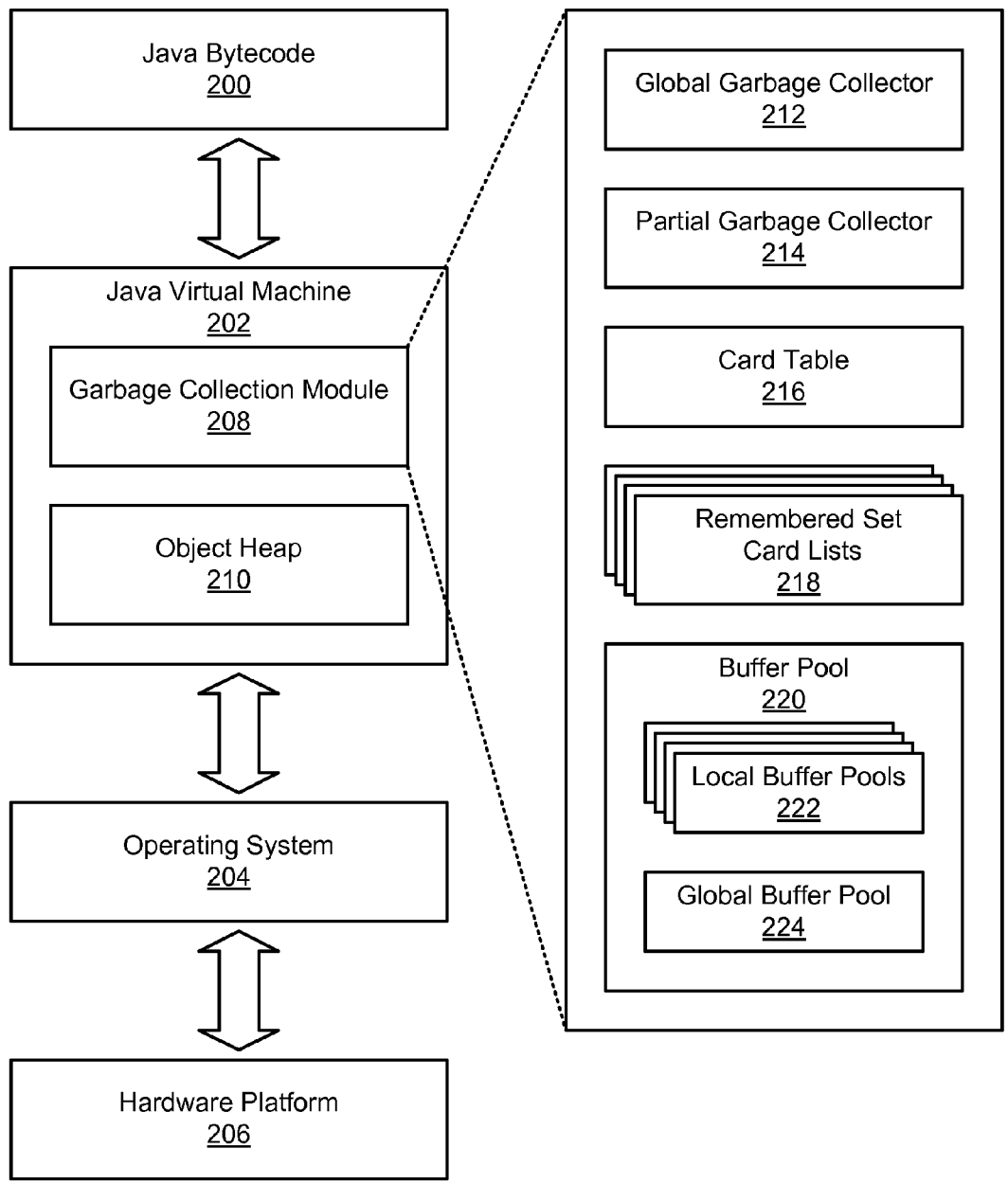
FIG. 2 is a high-level block diagram showing one example of an object-oriented managed runtime, in this example the Java Virtual Machine, comprising a garbage collection module in accordance with the invention.

Referring to FIG. 2, one example of an object-oriented managed runtime, in this example the Java Runtime Environment, is illustrated. The Java Runtime Environment is presented to show one example of a runtime environment in which various embodiments of the invention may operate. Nevertheless, the garbage collection techniques disclosed herein are not limited to the Java Runtime Environment but may operate or be adapted to operate in any object-oriented managed runtime that uses a garbage-collected object heap to store objects. Other non-limiting examples of runtime environments in which embodiments of the invention might operate include the Microsoft Common Language Runtime (CLR) and Smalltalk runtime. Thus, although particular reference is made herein to the Java Runtime Environment, the principles taught herein may also be applicable to other runtime environments.

As shown in FIG. 2, in the Java Runtime Environment, a Java Virtual Machine 202 may be configured to operate on a specific platform, which may include an underlying hardware and operating system architecture 204, 206. As shown, the Java Virtual Machine 202 receives program code 200, compiled to an intermediate form referred to as "bytecode" 200. The Java Virtual Machine 202 translates this bytecode 200 into native operating system calls and machine instructions for execution on the underlying platform 204, 206. Instead of compiling the bytecode 200 for the specific hardware and software platform 204, 206, the bytecode 200 may be compiled once to operate on all Java Virtual Machines 202. A Java Virtual Machine 202, by contrast, may be tailored to the underlying hardware and software platform 204, 206. In this way, the Java bytecode 200 may be considered platform independent.

In the Java Runtime Environment, the primary memory resource is a garbage-collected object heap 210. The object heap 210 provides memory for objects, each of which is an instance of a class. A garbage collection module 208, or subsystem 208, is provided in the Java Runtime Environment to reclaim memory occupied by objects that are no longer in use by a program. Among other benefits, the garbage collection module 208 frees a programmer from worrying about releasing objects that are no longer needed, which would otherwise require significant design effort from the programmer.

In certain embodiments, the garbage collection module 208 includes a global garbage collector 212 and a partial garbage collector 214. The global garbage collector 212 may perform garbage collection on the entire object heap 210, whereas the partial garbage collector 214 may perform garbage collection on only a portion of the object heap 210 at a time. In one embodiment, the global garbage collector 212 is a marking collector, whereas the partial garbage collector 214 is a copying collector. Similarly, in certain embodiments, the global garbage collector 212 performs global garbage collection concurrently (while a program is operating), whereas the partial garbage collector 214 stops the operation of the program when performing partial garbage collection.

The partial garbage collector 214 may perform garbage collection on a subset of the total number of regions in the object heap 210. The subset is referred to herein as a "collection set." The partial garbage collection reduces pause time and minimizes disruption of the main program. Because global garbage collection takes longer and is more disruptive to program operation, a global garbage collection may be performed less frequently than a partial garbage collection.

In certain embodiments, the garbage collection module 208 may include a card table 216. The card table 216 may contain a set of cards, each of which may represent a larger area in the object heap 210. For example, a card table 216 may contain a set of one-byte cards, where each one-byte card represents a 512-byte area of the object heap 210. These cards may be used to record changes to the object graph. For example, if a program modifies a reference field of an object, the corresponding card (i.e., the card representing the area that contains the object or the beginning of the object (if the object overlaps multiple areas) may be "dirtied" to indicate that a reference in the area has changed. "Dirtying" a card may be as simple as setting a bit of the card to indicate that a reference in the corresponding area of the object heap 210 has changed.

The card table 216 may be used by both the global garbage collector 212 and the partial garbage collector 214 during global and partial garbage collection cycles. For example, the global garbage collector 212 may use the card table 216 to record mutations in the object graph that occur during a concurrent global garbage collection cycle. Once the global garbage collection cycle has finished, the global garbage collector 212 may perform a "card cleaning" operation, where it scans objects in areas associated with dirtied cards. This will allow the global garbage collector 212 to find any live objects it may have missed during the main pass of the global garbage collection cycle.

The partial garbage collector 214 may use the same card table 216 to track inter-region references. Instead of remembering references in an object at the time they are created or modified, the corresponding card (i.e., the card associated with the area that contains the object) is dirtied. During a partial garbage collection cycle, the partial garbage collector 214 cleans the cards in the card table 216. During this card cleaning, objects in areas associated with dirty cards are scanned to determine if the objects contain inter-region references. If inter-region references are discovered, the corresponding cards are added to one or more remembered set cards lists (RSCLs) 218. For example, if a card associated with an area containing object A is dirty, object A will be examined to determine if it contains an inter-region reference (i.e., a reference referring to an object in another region). For example, if object A contains an inter-region reference to object B, the dirty card will be added to the RSCL 218 of the region containing B.

Thus, the card table 216 may be used by both the global garbage collector 212 and the partial garbage collector 214 for two different purposes. The global garbage collector 212 may use the card table 216 to track concurrent changes to object references during concurrent garbage collection, whereas the partial garbage collector 214 may use the card table 216 to build a remembered set. As will be explained in more detail in association with FIG. 3, because the global garbage collector 212 and partial garbage collector 214 share the card table 216, the card states may be expanded from two states {Dirty, Clean} to four states {Dirty, GGC must scan, PGC must scan, Clean}.

As mentioned above, each region has its own RSCL 218. The RSCLs 218 from all regions may collectively form a "remembered set." An RSCL 218 for a region may contain a list of cards that identify areas containing objects with references pointing to objects in the region. For an RSCL 218, a card may be a logical concept—it may simply refer to a range of memory (i.e., an area) in the object heap 210 that contains the beginning of an object having an inter-region reference. In certain embodiments, the RSCL 218 contains the base address of that address range in the object heap 210, as opposed to the address of the associated card in the card table 216.

As will be explained in more detail hereafter, each RSCL 218 may be organized as a set of buckets, with each bucket being associated with a garbage collection worker thread. Each bucket may include one or more buffers to store remembered cards. As buffers are filled up with cards, additional buffers may be added to the buckets. Similarly, as cards are emptied from buffers, buffers may be released from the buckets. In this way, each bucket in an RSCL 218 may grow or shrink as the number of stored cards increases or decreases. This makes efficient use of space and reduces the size of the remembered set.

As buffers are needed, they may be drawn from a buffer pool 220. Similarly, they may be returned to the buffer pool 220 when no longer needed. In certain embodiments, the buffer pool 220 may be divided into local buffer pools 222 and a global buffer pool 224. Each garbage collection worker thread associated with a bucket may draw buffers from and return buffers to a local buffer pool 222 associated with the garbage collection worker thread. This improves locality and avoids atomic/locking operations to reduce contention between garbage collection worker threads. If no buffers are available in its local buffer pool 222, a garbage collection worker thread may draw buffers from a global buffer pool 224 common to all garbage collection worker threads. This may require atomic/locking operations but may occur less frequently.

Figure 3:
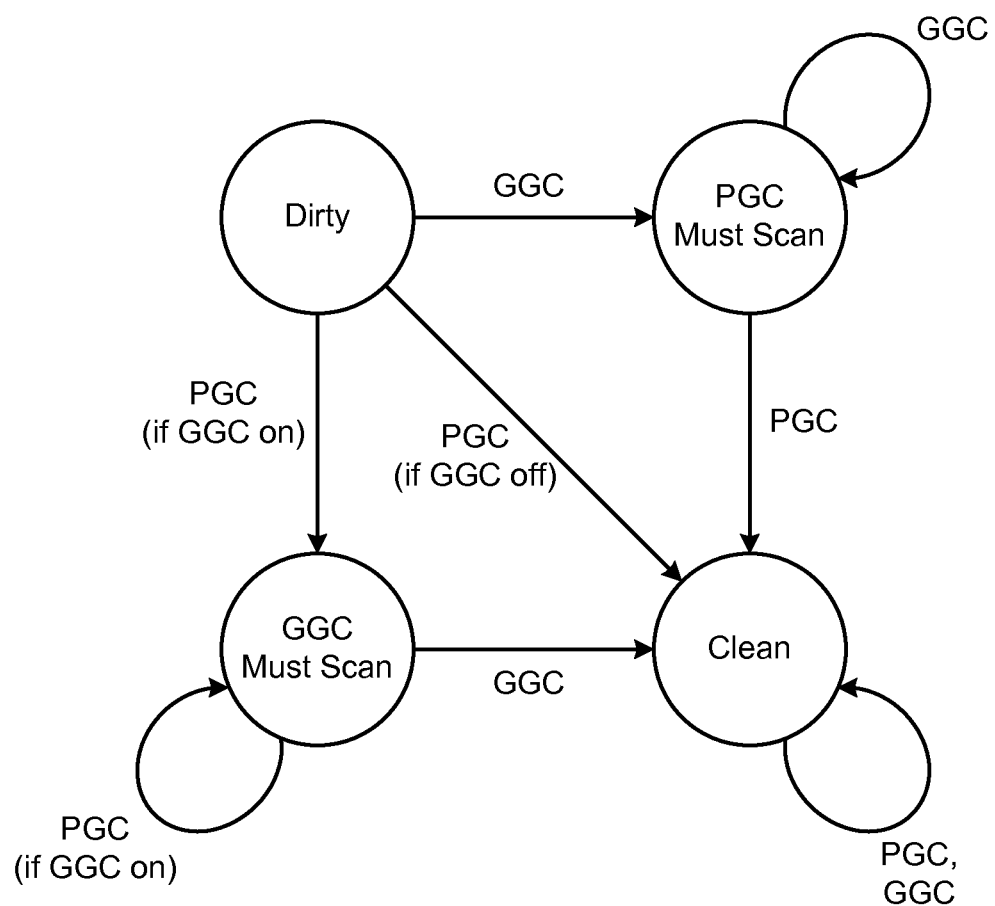
FIG. 3 is a state diagram showing transitions between card states.

Referring to FIG. 3, as previously mentioned, because both the global garbage collector 212 and partial garbage collector 214 utilize the same card table 216, each card in the card table 216 may be configured to be in one of four states {Dirty, GGC must scan, PGC must scan, Clean). These four states may be represented by two bits (00, 01, 10, 11). The transitions between the states during card cleaning are illustrated in FIG. 3. As shown, if a card is in the "Dirty" state and the global garbage collector 212 performs card cleaning to clean the card, the card transitions to the "PGC must scan" state, which indicates that the partial garbage collector 214 must still scan the card prior to moving to the clean state. In the "PGC must scan" state, the card is clean for the purposes of the global garbage collector 212 but still dirty for the purposes of the partial garbage collector 214.

Similarly, if a card is in the "Dirty" state and the partial garbage collector 214 performs card cleaning, the card transitions to the "GGC must scan" state (assuming the global garbage collector 212 is on), which indicates that the global garbage collector 212 must still scan the card before the card can transition to the clean state. In the "GGC must scan" state, the card is clean for the purposes of the partial garbage collector 214 but still dirty for the purposes of the global garbage collector 212. If the global garbage collector 212 is off and the partial garbage collector 214 scans the card, the card transitions to the "Clean" state. If the global garbage collector 212 is on, and both the global garbage collector 212 and partial garbage collector 214 have scanned the card, the card transitions to the "Clean" state.

Figure 4:
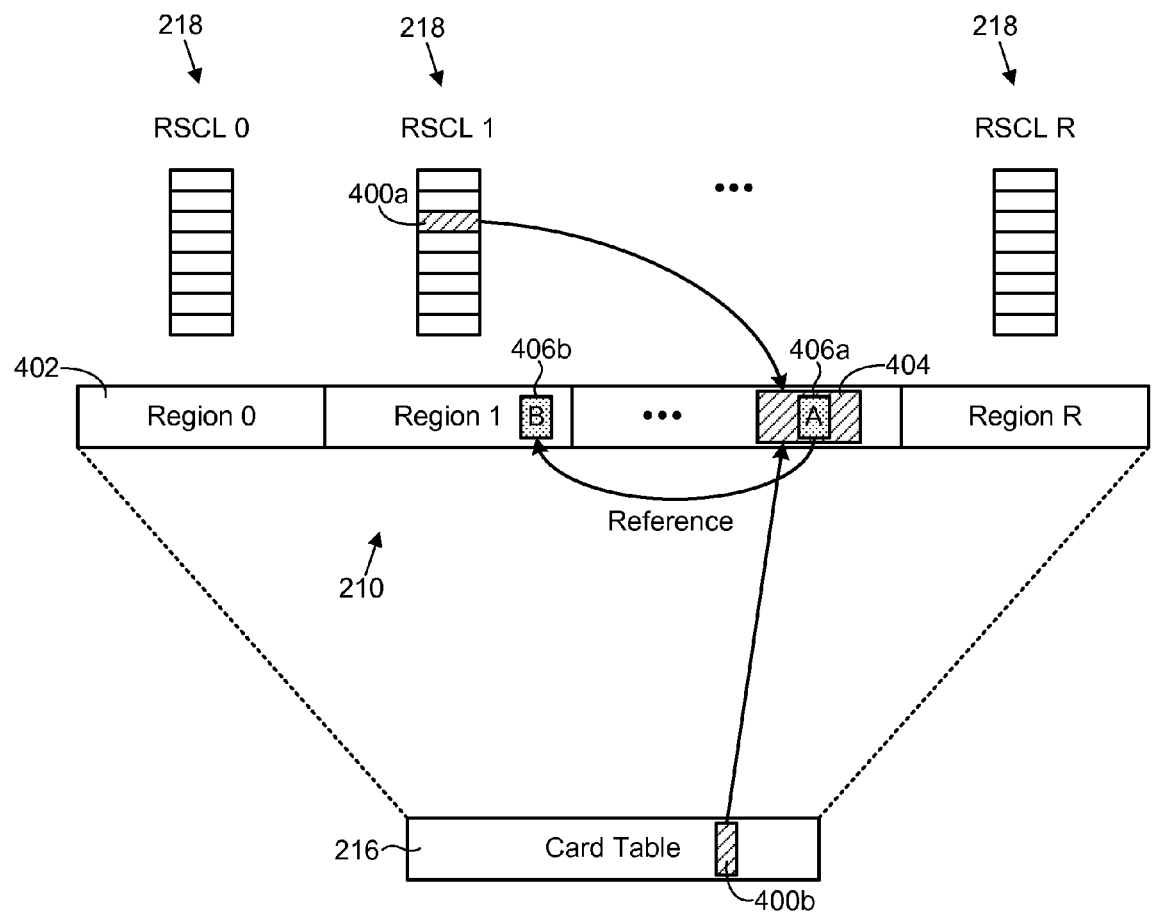
FIG. 4 is a high-level view showing the relationship between remembered set card lists (RSCLs), an object heap, and a card table.

Referring to FIG. 4, as previously mentioned, each region in the object heap 210 may have its own RSCL 218. Each RSCL 218 may store cards identifying areas that contain objects with references pointing to objects in the region associated with the RSCL 218. As previously mentioned, in an RSCL 218, a card 400a may be a logical concept—it may simply point to a range of memory (e.g., an area 404) in the object heap 210 that contains the beginning of an object having an inter-region reference. For example, in the illustrated example, the RSCL 218 for Region 1 contains a card 400a that includes an address. This address identifies an area 404 in the object heap 210 that contains an object 406a (i.e., object "A") that references an object 406b (i.e., object "B") in Region 1. In certain embodiments, to reduce the size of the cards 400a and thus the size of the RSCLs 218, only the significant bits of addresses are stored in the cards 400a. For example, in a 64-bit environment where cards 400a would normally require 64 bits to store addresses, the size of the cards 400a may be reduced to 32 bits (e.g., by truncating leading and trailing zeros of the addresses) if the size of the object heap 210 is limited to two Terabytes.

A card 400b in the card table 216, on the other hand, may be a physical concept—i.e., a card 400b in the card table 216 is a small area in memory (e.g., a one-byte area) that represents a larger area 404 (e.g., a 512-byte area) in the object heap 210. In certain embodiments, a simple calculation may be used to map the physical address of a card 400b in the card table 216 to the physical address of a corresponding area 404 in the object heap 210. In the illustrated embodiment, the card 400b associated with the area 404 may be dirtied to indicate that a reference has been modified or created in object "A" 406a that refers to another object, in this example object "B" 406b. Thus, a card 400a in an RSCL 218 and a corresponding card 400b in a card table 216 may both refer to the same area 404, albeit in different manners (i.e., the RSCL 218 uses a direct pointer, whereas the card table 216 uses a mapping). For optimal behavior, the size and alignment of the cards 400a in the RSCLs 218 and cards 400b in the card table 216 may be identical.

As will be explained in more detail in association with FIG. 7, cards may be added to an RSCL 218 at two times: (1) during card cleaning at the beginning of a partial garbage collection cycle; and (2) while traversing the live set of objects during the partial garbage collection cycle. In either case, if an inter-region reference is discovered, the source object's address is mapped to a logical card (a simple mask operation to truncate the lower insignificant bits). The logical card is then added to the RSCL 218 of the region containing the destination object.

Figure 5:
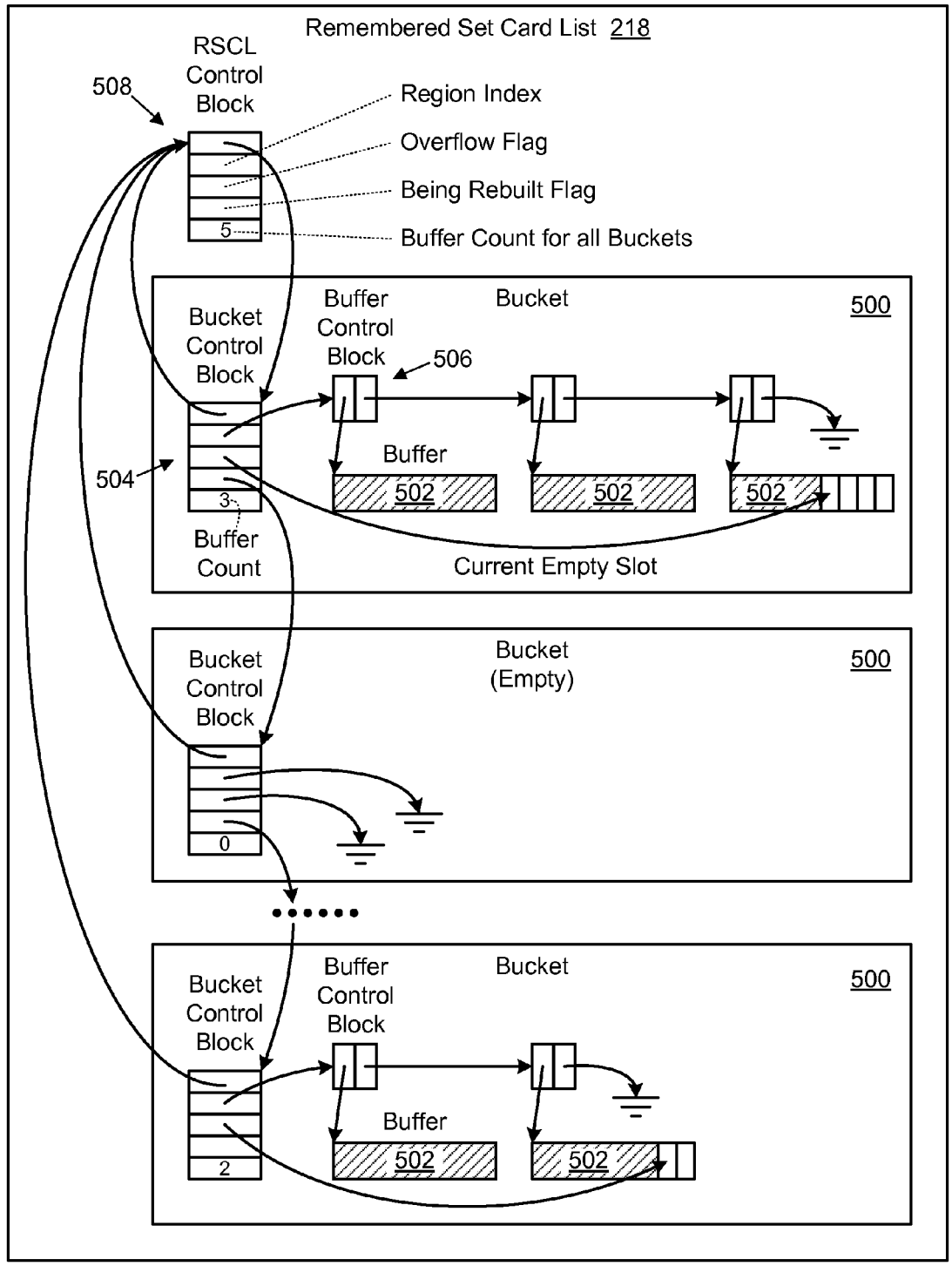
FIG. 5 is a high-level view showing one example of how an RSCL 218 may be internally organized.

Referring to FIG. 5, one example of the internal organization of an RSCL 218 is illustrated. As shown, in certain embodiments, each RSCL 218 may be organized as a set of buckets 500. Each bucket 500 may be associated with a different garbage collection worker thread. As garbage collection worker threads clean cards in the card table 216, they place cards into their buckets 500. Assigning the garbage collection worker threads their own buckets 500 will avoid contention as they write to the RSCLs 218.

As shown, each bucket 500 may include one or more fixed-size buffers 502 (i.e., buffers 502 having a fixed number of slots) to store remembered cards 400a. These buffers 502 may be arranged into a list, such that a first buffer 502 points to a second buffer 502, a second buffer 502 points to a third buffer 502, and so forth. In certain embodiments, a buffer control block 506 associated with a buffer 502 may store a pointer to the buffer 502 and a pointer to the next buffer 502 in the list.

Each bucket 500 may also include a bucket control block 504 to store different types of information. For example, the bucket control block 504 may include a field that points to the current empty slot in the current buffer 502. This indicates the location (or slot) where the next card 400a will be added. When a card 400a is added to a slot, the pointer is incremented to point to the next slot in the buffer 502. When a buffer 502 is full (has no more empty slots), a new buffer 502 may be added to the bucket 500. Such a buffer may be drawn from a local buffer pool 222, if one is available, and then from a global buffer pool 224 if no buffer 502 is available in the local buffer pool 222. In this way, the bucket 500 may grow to store additional cards 400a while minimizing empty space (thereby improving the efficiency of the remembered set). Buffers 502 may also be returned to a local buffer pool 222 to shrink a bucket 500. Buckets 500 may also be empty (include no buffers 502), in which case the pointer to the current empty slot is null.

In certain embodiments, the size of each buffer 502 is a power of 2 (in terms of slots), such as 32 or 64 slots. The base and top address may be aligned to the size of a buffer 502. Thus the base and top address may be derived from the address of any slot within a buffer 502. While slots in a buffer 502 may be contiguous in memory, the buffers 502 in a bucket 500 are not necessarily contiguous in memory.

In certain embodiments, each bucket control block 504 includes a buffer count field, which stores the number of buffers 502 in the corresponding bucket 500. The buffer count may be incremented when buffers 502 are added to a bucket 500 and decremented when released. The bucket control block 504 may also include a field pointing to the first buffer 502 in the bucket 500, a field pointing to the next bucket in the RSCL 218 (allowing the buckets 500 in an RSCL 218 to be arranged in a list), and a field identifying the RSCL 218 to which the bucket 500 belongs.

The RSCL 218 may also include an RSCL control block 508 to store various types of information about the RSCL 218. In certain embodiments, the RSCL control block 508 includes a field pointing to the first bucket 500 in the RSCL 218, a field identifying the region 402 to which the RSCL 218 belongs, a field storing an overflow flag (indicating whether the RSCL 218 is in an overflow condition), a field storing a "being rebuilt" flag (indicating whether the RSCL 218 is in the process of being rebuilt), a field storing a buffer count for all buffers (the sum of the buffer counts of all of the buckets 500). What is meant by an overflow condition and a "being rebuilt" condition will be discussed in more detail in association with FIG. 6.

Figure 6:
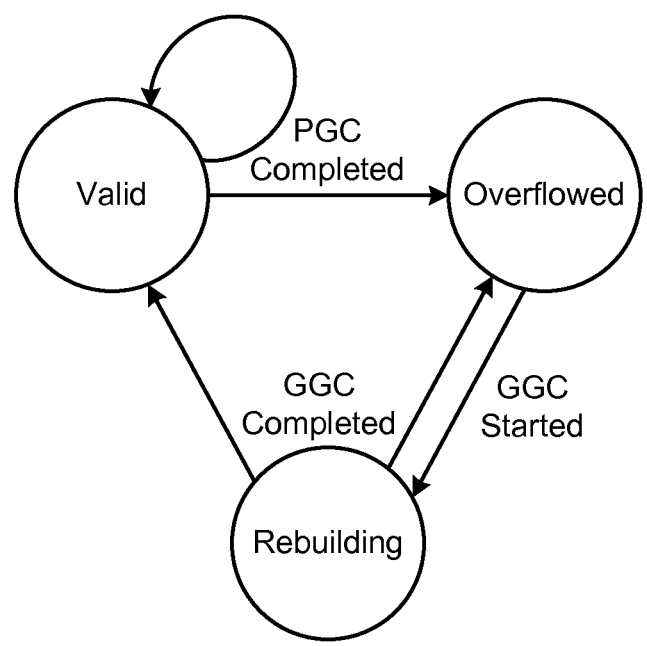
FIG. 6 is a state diagram showing RSCL state transitions for overflow handling.

Referring to FIG. 6, in certain embodiments, the total amount of memory allocated to buffers 502 (i.e., buffers 502 in the global buffer pool 224, local buffer pools 222, and RSCLs 218) may be limited to some percentage of the memory allocated to the object heap 210. For example, the total amount of memory allocated to buffers 502 may be limited to four percent of the size of the object heap 210. Testing performed by the instant inventors has shown that four percent is generally sufficient to accommodate the storage needs of the RSCLs 218. Because the size of the object heap 210 can change, the amount of space allocated to buffers 502 may also change to keep within the four percent limit.

Using the four percent limit discussed above, each RSCL 218 may be allocated, on average, buffer space that is about four percent of the size of a region. As stated, this allocation is just an average. Some regions 402 may be empty and thus may need no buffers 502 at all. Other regions 402, such as those containing objects with higher than average reference popularity, may have a greater need for buffers 502. These regions 402 may be allocated buffers 502 that make up more than four percent of the size of a region 402. In certain embodiments, an RSCL 218 may be constrained to n times the average allotment, such as eight times the average allotment. If the average allotment is four percent and n is equal to eight, an RSCL 218 may contain buffers 502 that make up as much as thirty-two (4×8) percent of the size of a region 402.

In certain embodiments, there is no limit on a bucket's buffer count. This means that it is possible that all buffers 502 that have been allocated to an RSCL 218 are allocated to a single bucket 500. The size of an RSCL 218 may be monitored using the RSCL buffer count previously discussed. Whenever a garbage collection worker thread adds or releases buffers 502 from a bucket 500, it may update the RSCL buffer count.

If an RSCL buffer count reaches a specified number (indicating that the size of the RSCL 218 has exceeded a limit), the RSCL 218 may be placed in an overflow state (e.g., by setting the RSCL's overflow flag). From that point, the RSCL 218 content becomes invalid. All subsequent requests to add cards 400a to the RSCL 218 may be ignored. Regions 402 with an overflowed RSCL 218 are excluded from collection sets, since the roots cannot be accurately determined. The RSCL 218 may remain in the overflow state until the next global garbage collection is performed. During the next global garbage collection cycle, the content of overflowed RSCLs 218 may be rebuilt.

In certain embodiments, an RSCL 218 may also be placed in an overflow state if a buffer 502 cannot be successfully allocated to a bucket 500. For example, if a thread cannot allocate a buffer 502 to its bucket 500 because no buffers 502 are available in its local buffer pool 222 or the global buffer pool 224, the thread may place the RSCL 218 in an overflow state. Alternatively, the thread may place the RSCL 218 with the largest number of buffers 502 into an overflow state and release the RSCL's buffers 502 to make them available to other RSCLs 218.

At the beginning of a global garbage collection cycle, the global garbage collector 212 may put the RSCL 218 into a temporary "being rebuilt" state (e.g., by setting the RSCL's "being rebuilt" flag). The manner in which the RSCL 218 is rebuilt will be discussed in association with FIG. 7. While in the "being rebuilt" state, the partial garbage collector 214 is prohibited from including the associated region 402 in a collection set. The partial garbage collector 214 may also be prohibited from updating the content of the RSCL 218. If, after rebuilding the RSCL 218, the global garbage collector 212 reduces the size of the RSCL 218 below the above-mentioned limit, the RSCL 218 may be placed in a valid state (e.g., by resetting the overflow and "being rebuilt" flags). If the global garbage collector 212 is unable to sufficiently shrink the RSCL 218 below the limit, the RSCL 218 may remain in the overflow state.

From the moment an RSCL 218 is placed in the overflow state, the content of the RSCL 218 becomes invalid. This allows all of the buffers 502 in the RSCL 218 to be released. When a garbage collection worker thread places an RSCL 218 in the overflow state or encounters an RSCL 218 already in the overflow state, the garbage collection worker thread may release all buffers 502 in its associated bucket 500 to the thread's local buffer pool 222. Once the local buffer pool 222 fills up, the garbage collection worker thread may move buffers 502 from the local buffer pool 222 to the global buffer pool 224. Moving buffers 502 to the local buffer pool 222 does not require a lock, thereby avoiding contention. Moving buffers 502 to the global buffer pool 224 does require a lock, although this event will occur with less frequency. If any buffers 502 remain in an overflowed RSCL 218 at the end of a garbage collection cycle, the remaining buffers 502 may be released at this time.

Figure 7:
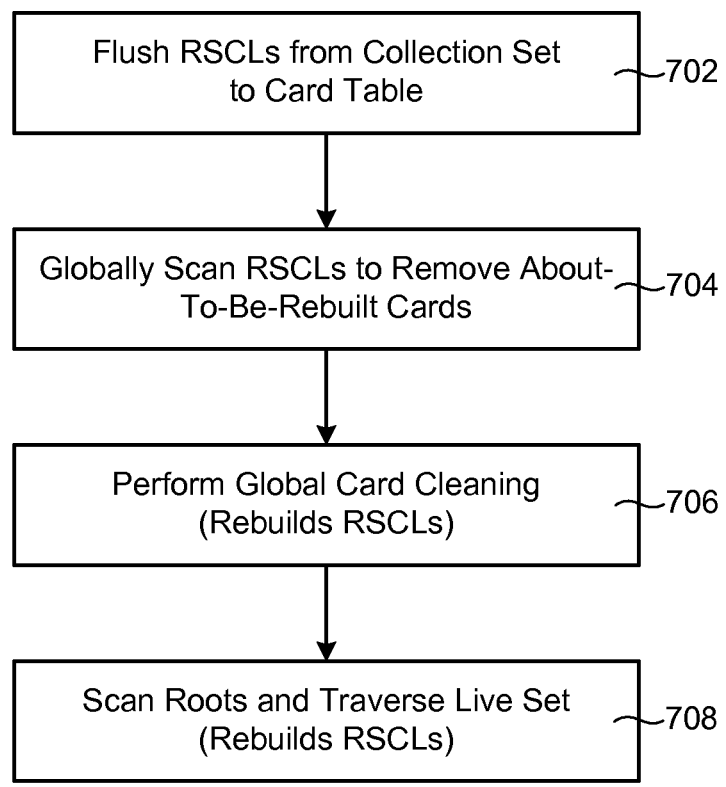
FIG. 7 is a flow diagram showing how RSCLs are processed, and more specifically how duplicate and invalid/stale cards may be removed from RSCLs.

Referring to FIG. 7, for various reasons, duplicate cards 400a may exist in RSCLs 218. Such duplicate cards 400a may exist in a single RSCL 218 (e.g., a single object has multiple reference slots referring to the same region 402) or in multiple RSCLs 218 (e.g., a single object has multiple reference slots referring to different regions 402). Such duplicates are undesirable because they may increase the size of RSCLs 218 and thereby decrease memory utilization efficiency. Additional time and resources may also be needed to process duplicate cards 400a. In some cases, duplicate cards 400a may undesirably create overflow conditions in RSCLs 218.

Although is it unlikely that duplicate and invalid/stale cards can be eliminated entirely, the partial garbage collector 214 may use several different mechanisms to reduce duplicate and invalid/stale cards in the RSCLs 218. Three of these mechanisms are described below.

First, the partial garbage collector 214 may remove duplicates using a simple duplicate detection mechanism. Each time a thread attempts to add a card 400a to its bucket 500 in an RSCL 218, a check may be performed to determine if the card 400a is equivalent to the previously stored card 400a, which is in the previous buffer slot. If the card 400a is equivalent to the previously stored card 400a, the card 400a is not added to the RSCL 218. This is useful when scanning an object with multiple references (often a reference array) to objects that reside in same region. To simplify this technique, the check may be skipped upon adding the first card 400a to a new buffer 502, which would require peeking into the last slot of the previous buffer 502. Only subsequent additions to a buffer 502 may be compared to the previous slot.

Second, the partial garbage collector 214, at the beginning of a partial garbage collection cycle, may flush the contents of each RSCL 218 in the collection set to the card table 216. This will dirty (i.e., set to the "PGC must scan" state if currently in the "Clean" state, or set to the "Dirty" state if currently in the "Dirty" state or "GGC must scan" state) the corresponding cards 400b in the card table 216. Because of the way the card table 216 is implemented (where one card 400b is present for each area in the object heap 210), duplicates cannot exist in the card table 216. Thus, flushing duplicate cards 400a from the RSCLs 218 will result in a single dirty card in the card table 216. After the cards 400a have been flushed, the card table 216 will contain cards 400b that were either dirtied as a result of the flush, or dirtied by application threads in response to the modification or creation of object references. The partial garbage collector 214 may then clean the dirty cards 400b in the card table 216. During this process, the cards 400b may be scanned and inserted into the appropriate RSCLs 218.

Third, at the beginning of a partial garbage collection cycle, the partial garbage collector 214 may globally scan all RSCLs 218 of the object heap 210 and remove cards 400a that are about to be rebuilt (re-inserted into the RSCLs 218). Such cards 400a may include, for example, cards that originate from regions in the collection set, cards that are already dirty in the card table, and cards that originate from empty regions. If any such cards 400a are discovered, the cards 400a may be removed from the RSCLs 218. After removing such cards 400c, the RSCLs 218 may be compacted. This may free up buffers 502, possibly allowing them to be released back to the local buffer pool 222. Any still valid cards (i.e., cards containing valid inter-region references) will be re-inserted into the RSCLs 218 when the RSCLs 218 are rebuilt during card cleaning or live set traversal. The global scan discussed above may be performed before the rebuild phases but after the RSCLs 218 from the collection set are flushed to the card table 216.

FIG. 7 summarizes the process discussed above. As shown, the partial garbage collector 214 initially flushes 702 cards 400a from the RSCLs 218 in the collection set to the card table 216. The partial garbage collector 214 then globally scans 704 all RSCLs 218 to remove cards 400a that are about to be rebuilt. The partial garbage collector 214 then cleans 706 the cards 400b in the card table 216. This will at least partially rebuild the RSCLs 218. The partial garbage collector 214 then scans 708 the roots of objects in the collection set and traverses 708 the live set of objects. This will complete the rebuild of the RSCLs 218.

Figure 8:
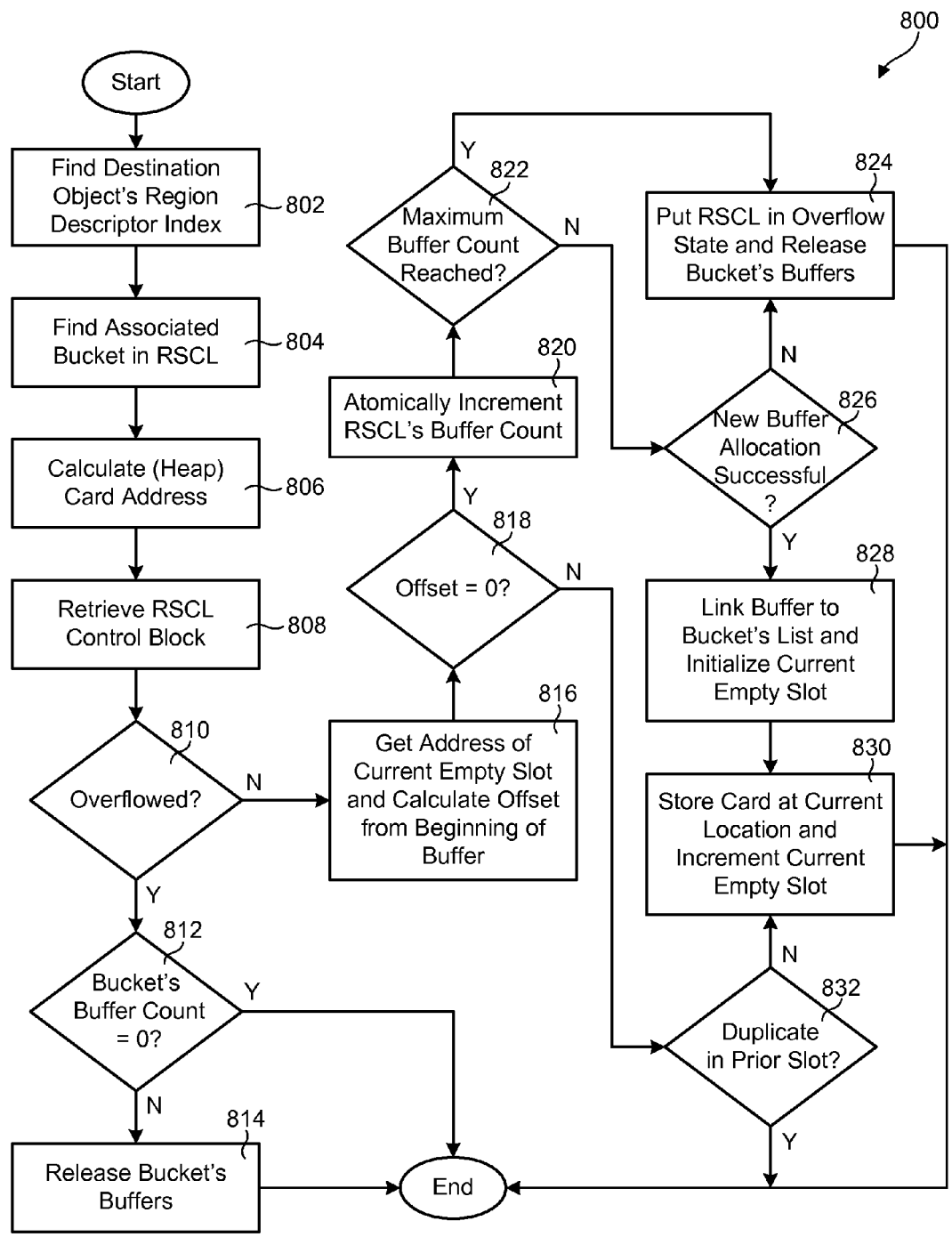
FIG. 8 shows one embodiment of a process for adding a card to an RSCL upon discovering an inter-region reference during a partial garbage collection cycle.

FIG. 8 shows one embodiment of a process 800 for adding a card 400a to an RSCL 218 upon discovering an inter-region reference from a source object to a destination object. Such a process 800 may be executed by a garbage collection worker thread upon discovering an inter-region reference during card cleaning or live set traversal. As shown, the thread initially finds 802 the destination object's region descriptor index. This will allow the thread to identify the RSCL 218 of the region 402 containing the destination object. The thread may then find 804 its bucket 500 in the RSCL 218. The thread may then calculate 806 the address that will be stored in the card 400a. This address will point to the area 404 of the object heap 210 that contains the beginning of the source object.

The thread may then retrieve 808 the RSCL control block 508 to determine 810 whether the RSCL 218 is in the overflow state (i.e., whether the overflow bit is set). If the RSCL 218 is in the overflow state, the thread determines 812 whether the bucket's buffer count is zero. If the buffer count is zero, the process 800 ends. If the buffer count is not zero, the thread releases 814 the bucket's buffers 502 (i.e., returns the buffers 502 to the local buffer pool 222) and the process 800 ends.

If, at step 810, the thread determines that the RSCL 218 is not in the overflow state, the thread retrieves 816 the address of the current empty slot and calculates 816 the offset from the beginning of the buffer 502. This offset may be used to determine whether the end of the current buffer 502 has been reached or whether a buffer 502 has yet to be added to the bucket 500. If, at step 818, the offset is zero (indicating that the current buffer 502 is full or a buffer 502 has yet to be added to the bucket 500), the thread atomically increments 820 the RSCL's buffer count in preparation to add a new buffer 502. The thread then determines 822 whether the maximum buffer count has been reached (to determine whether the RSCL 218 has reached its size limit). If the maximum buffer count has been reached, the thread puts 824 the RSCL 218 into the overflow state (i.e., by setting the RSCL's overflow flag) and releases the bucket's buffers. The process 800 then ends.

If, at step 822, the maximum buffer count has not been reached, the thread attempts to allocate a new buffer and determines 826 whether the allocation was successful. If the allocation was not successful (because no buffers 502 were available in the buffer pools 222, 224, for example), the thread puts 824 the RSCL 218 into the overflow state and releases 824 the bucket's buffers 502, if any. If the allocation was successful, the thread links 828 the new buffer 502 to the bucket's list of buffers 502 and initializes 828 the current empty slot in the bucket control block 504. The thread then stores 830 the card 400a calculated at step 806 in the buffer's current empty slot, which in this case is the first slot in the buffer 502, and increments 830 the current empty slot. The process 800 then ends.

If, at step 818, the thread determines that the offset is not equal to zero (indicating that the bucket 500 includes at least one buffer 502 with an empty slot), the thread determines 832 whether a duplicate of the card calculated at step 806 is present in the prior slot of the buffer 502. If a duplicate is present, the process 800 ends without storing the card 400a calculated at step 806. If a duplicate is not present, the thread stores 830 the card 400a calculated at step 806 in the current empty slot of the current buffer 502 and increments 830 the current empty slot. The process 800 then ends.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for efficiently implementing a remembered set in a region-based garbage collector, the method comprising:
   maintaining, for each region in an object heap, a remembered set card list (RSCL), the RSCL containing a list of cards from a card table, wherein each card in the RSCL identifies an area in the object heap that contains at least one object referencing an object in the region associated with the RSCL;
   establishing a collection set, the collection set identifying a subset of regions in the object heap on which to perform partial garbage collection;

flushing cards from the RSCLs associated with the collection set to the card table, wherein flushing a card to the card table comprises dirtying the card in the card table;

discarding cards that are about to be rebuilt from all the RSCLs;

globally cleaning the card table, wherein globally cleaning the card table comprises flushing dirty cards from the card table to the RSCLs; and adding cards to the RSCLs for inter-region references discovered while traversing live objects in the collection set.

2. The method of claim 1, wherein discarding cards that are about to be rebuilt comprises discarding cards that originate from regions in the collection set.

3. The method of claim 1, wherein discarding cards that are about to be rebuilt comprises discarding cards which are already dirty in the card table.

4. The method of claim 1, wherein discarding cards that are about to be rebuilt comprises discarding cards that originate from empty regions.

5. The method of claim 1, wherein each RSCL comprises a plurality of buckets in which to store cards, each bucket associated with a thread.

6. The method of claim 5, wherein each bucket is divided into buffers, and each thread is configured to dynamically add buffers to its associated bucket as space is needed to store cards.

7. The method of claim 6, wherein each thread includes its own local buffer pool, and each thread is configured to dynamically add buffers to its associated bucket from its own local buffer pool.

8. The method of claim 1, further comprising placing an RSCL into an overflow state if a size of the RSCL reaches a threshold.

9. The method of claim 1, wherein the card table is used to both record object graph mutations during a concurrent global garbage collection cycle, and track inter-region references during a partial garbage collection cycle.

10. A computer program product to efficiently implement a remembered set in a region-based garbage collector, the computer program product comprising a non-transitory computer-usable storage medium having computer-usable program code embodied therein, the computer-usable program code comprising:

computer-usable program code to maintain, for each region in an object heap, a remembered set card list (RSCL), the RSCL containing a list of cards from a card table, wherein each card in the RSCL identifies an area in the object heap that contains at least one object referencing an object in the region associated with the RSCL;

computer-usable program code to establish a collection set, the collection set identifying a subset of regions in the object heap on which to perform partial garbage collection;

computer-usable program code to flush cards from the RSCLs associated with the collection set to the card table, wherein flushing a card to the card table comprises dirtying the card in the card table;

computer-usable program code to discard cards that are about to be rebuilt from all the RSCLs;

computer-usable program code to globally clean the card table, wherein globally cleaning the card table comprises flushing dirty cards from the card table to the RSCLs; and computer-usable program code to add cards to the RSCLs for inter-region references discovered while traversing live objects in the collection set.

11. The computer program product of claim 10, wherein discarding cards that are about to be rebuilt comprises discarding cards that originate from regions in the collection set.

12. The computer program product of claim 10, wherein discarding cards that are about to be rebuilt comprises discarding cards which are already dirty in the card table.

13. The computer program product of claim 10, wherein discarding cards that are about to be rebuilt comprises discarding cards that originate from empty regions.

14. The computer program product of claim 10, wherein each RSCL comprises a plurality of buckets in which to store cards, each bucket associated with a thread.

15. The computer program product of claim 14, wherein each bucket is divided into buffers, and each thread is configured to dynamically add buffers to its associated bucket as space is needed to store cards.

16. The computer program product of claim 15, wherein each thread includes its own local buffer pool, and each thread is configured to dynamically add buffers to its associated bucket from its own local buffer pool.

17. The computer program product of claim 16, wherein each thread is configured to dynamically add buffers to its associated bucket from a global buffer pool if no buffers are available in its own local buffer pool.

18. The computer program product of claim 10, further comprising computer-usable program code to place an RSCL into an overflow state if a size of the RSCL reaches a threshold.

19. An apparatus to efficiently implement a remembered set in a region-based garbage collector, the apparatus comprising:

a processor;

a memory device to store modules for execution on the processor, the modules comprising:

a garbage collection module to maintain, for each region in an object heap, a remembered set card list (RSCL), the RSCL containing a list of cards from a card table, wherein each card in the RSCL identifies an area in the object heap that contains at least one object referencing an object in the region associated with the RSCL;

the garbage collection module further configured to establish a collection set, the collection set identifying a subset of regions in the object heap on which to perform partial garbage collection;

the garbage collection module further configured to flush cards from the RSCLs associated with the collection set to the card table, wherein flushing a card to the card table comprises dirtying the card in the card table;

the garbage collection module further configured to discard cards that are about to be rebuilt from all the RSCLs;

the garbage collection module further configured to globally clean the card table, wherein globally cleaning the card table comprises flushing dirty cards from the card table to the RSCLs; and the garbage collection module further configured to add cards to the RSCLs for inter-region references discovered while traversing live objects in the collection set.

20. The apparatus of claim 19, wherein the cards that are about to be rebuilt include at least one of the following: (1) cards that originate from regions in the collection set; (2) cards which are already dirty in the card table; and (3) cards that originate from empty regions.

* * * * *